United States Patent Office 3,497,315
Patented Feb. 24, 1970

3,497,315
PROCESS FOR PREPARING ALKALI METAL
CYANATES
Randall N. Pratt, Claymont, Del., assignor to E. I. du Pont de Nemours and Company, Wilmington, Del., a corporation of Delaware
No Drawing. Continuation-in-part of application Ser. No. 569,034, Aug. 1, 1966. This application July 10, 1967, Ser. No. 651,983
Int. Cl. C01c 3/10; C01d 1/26
U.S. Cl. 23—75                                    11 Claims

ABSTRACT OF THE DISCLOSURE

An alkali metal carbonate and urea are reacted in the presence of a high-purity heel of the corresponding alkali metal cyanate at 80 to 225° C. to obtain high yields of an alkali metal cyanate. The heel should constitute at least 35% of the reaction mixture. The cyanate so obtained is of very high purity.

Related application

This application is a continuation-in-part of my co-pending application, Ser. No. 569,034, filed Aug. 1, 1966, now abandoned.

Background of the invention

Alkali metal cyanates are well known and they have many applications. They are useful in the treatment of various fabricating materials, e.g., the heat treatment of steel; they are useful as chemical intermediates in the preparation of other chemicals, such as cyanides and isocyanates; and some are useful as agricultural chemicals.

The existing processes for the manufacture of alkali metal cyanates however suffer from a number of disadvantages. One method of manufacturing alkali metal cyanates involves the reaction of alkali metal carbonates and organic nitrogen compounds under melt conditions at temperatures over 550° C. This process results in the rapid formation of cyanates but also results in side reactions and the formation of by-products, the principal side reaction being the production of cyanides.

Because of these side reactions and the formation of by-products, costly control and purification procedures must be used to keep the cyanide concentration of the final product within acceptable limits. Additionally, because of the high temperatures utilized, there is a corrosion problem with the materials used to construct the reaction vessel and there is a need for unconventional sources of heat. These and other problems are of sufficient magnitude to make the manufacture of sodium cyanate or other potentially low cost alkali metal cyanates by the high temperature fusion processes economically unattractive.

Low temperature processes for producing sodium cyanate and the other alkali metal cyanates are also known in the art. By low temperature it is meant such temperatures wherein the reaction mass remains essentially in the solid state rather than molten. Thus sodium cyanate has been prepared from urea and sodium carbonate by the reaction between these compounds at 80 to 200° C. However, this low temperature process has generally resulted in a cyanate product containing significant amounts of the unreacted carbonate and urea. Additionally, the product has contained other impurities such as insoluble nitrogen compounds, an example of which is cyamelide. Because of the presence of these impurities, additional steps have been required for purification, for example recrystallization of sodium cyanate from water solution. This recrystallization step is costly because of the low solubility of sodium cyanate and its susceptibility to hydrolysis. Some reduction of the impurities present in the product has been obtained by grinding the starting urea and carbonate to a particle size of less than 20 microns. This grinding however adds another step to the process and in the case of urea, this step is difficult and time-consuming because of the stickiness of urea and its tendency to cake.

By the process of this invention sodium cyanate of from 98 to 100% purity which is essentially free of cyanide can be obtained. Other alkali metal cyanates of adequate purity for most uses can also be obtained. In the process of this invention, no special treatment of the urea or alkali metal carbonate is required. The reaction can be conducted in simple equipment since dry, granular materials are the starting reactants, and the product is an easy-to-handle powder, not a melt. Additionally, because of the low temperatures involved, cast iron, wrought iron, or stainless steel can be used as the material of construction for the reaction vessel.

Summary of the invention

In summary, this invention relates to an improved process for preparing alkali metal cyanates which comprises reacting an alkali metal carbonate and urea in the presence of a heel of an alkali metal cyanate which is at least 90% pure at a temperature of from 80 to 225° C., said heel comprising at least 35% by weight of the reaction mixture and the alkali metal of said carbonate and the alkali metal of said cyanate in said heel being the same.

Detailed description of the invention

*Starting materials.*—Technical grade anhydrous alkali metal carbonates can be used in the subject process and are preferred for reasons of economy and efficiency. They need not be finely-ground.

Shotted urea is the preferred form of urea because of its physical and handling characteristics. However, granular crystal urea can also be used, and it need not be ground to a fine powder. Although not necessary, finely divided materials can be used in the process of the invention.

The material used in the heel will, of course, correspond to the desired product. The alkali metal cyanate used in the heel should be relatively pure, at least 90% and preferably more than 95% pure. The purity of the final product depends upon the purity of the raw materials as well as on the size and purity of the heel. In the subject process when commercial grade sodium carbonate and urea are used with a high purity heel, final products over 98% pure are obtained.

*Process conditions.*—The reaction can be conducted in any suitable reaction vessel which has means for mixing the reactants and which provides a good heat transfer rate. Apparatus having means for providing intensive rubbing, smearing and mixing action are preferred. By "intensive rubbing, smearing and mixing action" is meant that type of action which is provided by the well known muller-type mixers. Thus, the dry, solid reactants can be stirred in a batch reactor which provides reasonably good agitation such as a double arm mixer or a muller-type mixer or in continuous type reactors such as a hollow screw conveyor in combination with a muller-type mixer. For large preparations, heat transfers equipment should be of adequate surface area to assure efficient heating of the reaction mixture.

The reaction vessel can be heated by conventional heat transfer media such as steam at 100 to 500 p.s.i. or oil at 175° to 250° C. The reaction vessel should also provide means for the removal of gases during the process; as the bulk temperature of the mixture gradually increases, ammoniacal vapors, e.g., ammonia, water and carbon dioxide, are evolved.

In view of the low temperature operation, the corrosion conditions are not severe and ordinary materials of construction such as cast iron, wrought iron and various stainless steels are satisfactory for materials of construction.

In a batch process the heel of dry alkali metal cyanate in the solid state is initially charged into the reaction vessel. The starting heel can be from the material remaining from a previous batch and will therefore usually be at least 98% pure. The heel should comprise at least 35 percent by weight of the reaction mixture. When manufacturing sodium cyanate, the heel preferably comprises at least 45 percent by weight; when manufacturing potassium cyanate, the heel preferably comprises at least 55 percent by weight of the initial charge. From the process viewpoint there is no upper limit to the percent of cyanate heel in the reaction mixture; however, in a batch process, very large heels are uneconomical. As previously mentioned, the alkali metal cyanate in the heel should be relatively pure, at least 90% and preferably 95 to 100% pure.

The reactants are generally charged into the reaction vessel in equivalent amounts of the urea and the appropriate alkali metal carbonate. In a typical embodiment, the mole ratio used can be ½ mole alkali metal carbonate, 1 mole urea and 2 moles of the corresponding alkali metal cyanate. This charge will produce 3 moles of alkali metal cyanate or 1 mole of new product. In some cases an excess of urea is desirable; this excess should be less than 10% and normally less than 2%. The excess urea will evolve as gaseous materials and thus will not result in purity problems. However, if a deficiency of urea is used, the quality of the product will be lowered due to the presence of unreacted alkali metal carbonate. The process is operable with an excess of the carbonate, but the purity of the end product will suffer.

In the subject process the sequence of addition of the reactants is not critical. Under normal operating conditions, the two reactants will be blended together in the reaction vessel in the presence of the heel and not premixed and then added to the reaction vessel. In a continuous operation, the alkali metal carbonate is usually added first although this again is not critical.

After the reactants have been added, the mixture is agitated and gradually heated at atmospheric pressure to convert the reactants to the alkali metal cyanate. By-product gases, e.g., ammonia, water, carbon dioxide, etc. are evolved and removed from the reactor during the course of the reaction.

During the batch reaction the mixture is heated to 80 to 225° C. In the manufacture of sodium cyanate, 95 to 150° C. is the preferred range whereas for potassium cyanate, 95 to 220° C. is the preferred range. Lower operating temperatures can be used, but they result in prolonged reaction time. In these batch operations, generally the process can be conducted by bringing the heel up to a temperature of 120° to 130° C. and then adding the urea and alkali metal carbonate. The process is then continued until the temperature reaches an optimum final value of 120 to 150° C. in the manufacture of sodium cyanate and an optimum final value of 135 to 220° C. in the manufacture of potassium cyanate. At this time, the reaction will be complete and the high purity product obtained in high yield.

When the ingredients are intensively rubbed, smeared and heated, gas evolution becomes noticeable at about 80° C. By the time the temperature reaches 120° C. well over 50% of the reaction may have occurred. The final temperature reached is determined by the temperature of the heating medium and the heat losses of the system. Upon completion of the reaction, the product is cooled to a temperature which is convenient for handling and then is discharged from the reactor.

The length of the heating cycle is not critical and it depends largely upon the mixing and heat transfer characteristics of the system involved. The reaction batch is heated and agitated as long as vapors are still evolving from the reaction mixture. Generally this is a total of 4 to 7 hours. Longer times are not adverse and although uneconomical, they can be used and cyanide will not be produced.

The physical properties of the reaction mass change slightly during the reaction. Early in the process, the originally free-flowing mixture becomes slightly plastic and the power requirements for agitation are at a maximum; thereafter the mixture again becomes a free-flowing, easily-handled powder. A screen analysis of a typical product shows particles ranging downwards from 450 microns. Often 35 percent or more of the particles are larger than 75 microns.

As previously mentioned, the purity of the final product depends upon the purity of the raw materials. When commercial grade reactants are used, the final product can be over 98% pure, which is substantially purer than commercially available alkali metal cyanates. In addition, chemical analyses which are ordinarily used to detect cyanides detect less than 1 p.p.m. of cyanide in the final product.

The above description has particularly described a batch operation of the subject process; however the process can also be run continuously. Thus a single, conveying reactor may be used, such as a screw conveyor with provisions for internal intensive smearing, rubbing and mixing. In a continuous operation, a portion of the product stream is recycled. The recycled product is then mixed with the urea and alkali metal carbonate and charged to the entrance of the reactor. In an alternate embodiment of the continuous operation, several batch reactors can be operated in a cascade system with each successive reactor at a higher temperature. Other alternative procedures will be evident to those skilled in the art. In each case, adequate provisions should be employed for the removal of gaseous by-products.

In the continuous operation the temperature is preferably within the range of 110 to 225° C. with a preferred range for the manufacture of sodium cyanate being from 150 to 170° C. In this continuous operation the size of the equipment and the ratio of the heat transfer to the mass passing to the reactor will determine the time of the reaction. In the normal case, hold up times of 1 to 5 hours will be preferred.

The important aspect with respect to temperature and time in either the batch or continuous operation is that the temperature should not be allowed to go above about 225° C. so as to prevent production of cyanide and that the starting materials are heated and mixed until the evolution of reaction vapors is substantially completed.

The following examples are offered to illustrate the process of the invention. All parts and percentages are by weight unless otherwise indicated.

Example 1

A heel of 98% pure sodium cyanate comprising 5.20 parts is charged to a jacketed, stainless steel double arm mixer heated with steam at 110 p.s.i.g. (173° C.). The blades of the mixer, turning at 50 r.p.m., are engaged and the heel is heated for 1.8 hours, at which time its temperature is 164° C.

At this point, first 2.25 parts of soda ash and then 8 minutes later, 2.55 parts of shotted urea are dumped into the mixer. The batch, at first slightly wet and lumpy, is heated and stirred for 6 more hours. After being heated for 2 hours, the batch gradually becomes free-flowing and dusty. Gases smelling strongly of ammonia are evolved throughout the 6 hour period are vented off.

Samples are taken at hourly intervals and analyzed for sodium cyanate, urea and sodium carbonate. The following results are obtained:

| Time, hours | Start | 1.0 | 2.0 | 3.0 | 4.0 | 5.0 | 6.0 |
|---|---|---|---|---|---|---|---|
| Batch Temperature, °C | | 140 | 160 | 160 | 160 | 160 | 160 |
| Sodium cyanate, percent | 52.0 | 91.0 | 96.1 | 97.1 | 98.5 | 98.9 | 99.1 |
| Urea, percent | 25.5 | 4.0 | 2.3 | 1.7 | 0.4 | 0.2 | 0.2 |
| Sodium carbonate, percent | 22.5 | 5.8 | 1.3 | 1.2 | 1.0 | 0.9 | 1.0 |
| Total, percent | 100.0 | 100.8 | 99.7 | 99.9 | 99.9 | 100.0 | 100.3 |

At the end of the run, a total of 7.8 parts of product is discharged from the mixer for a yield of 99.5% pure sodium cyanate. No corrosion of the stainless steel mixer is observed, and a cyanide test shows the cyanide concentration of the product is less than 1 p.p.m.

If the results of the run are analyzed, it can be seen that 86% of the sodium cyanate produced is formed in the first hour of operation, while the contents of the mixer are being heated to 140° C. Further, after another hour, a total of 94.9% of the total cyanate synthesized is formed.

Example 2

The following experiment is run in the 50 r.p.m., double arm mixer used for Example 1 and it demonstrates the effect of the absence of the heel.

After heating the empty mixer with 110 p.s.i.g. steam for 15 minutes, it is charged with 4.7 parts of soda ash, and 12 minutes later, with 5.3 parts of shotted urea. Stirring and heating are continued for seven hours. The mix becomes liquid after 13 minutes and then gradually stiffens and balls. After three hours it is fluffy and powdery. Gases smelling of ammonia are evolved.

Samples are taken at one hour intervals and after analysis, the following results are obtained:

| Time, hours | 1.0 | 2.0 | 3.0 | 4.0 | 5.0 | 6.0 | 7.0 |
|---|---|---|---|---|---|---|---|
| Batch temperature, °C | 136 | 138 | 150 | 155 | 155 | 156 | 155 |
| Sodium cyanate, percent | 43.6 | 68.6 | 75.4 | 77.6 | 78.0 | 77.9 | 77.9 |
| Urea, percent | 25.3 | 17.0 | 11.6 | 11.2 | 11.2 | 11.0 | 11.0 |
| Sodium carbonate | 12.6 | 6.2 | 6.1 | 6.2 | 6.2 | 6.2 | 6.2 |
| Total, percent | 81.5 | 91.8 | 93.1 | 95.0 | 95.4 | 95.1 | 95.1 |

At the end of the run, 6.05 parts are discharged for an 82.2% yield of sodium cyanate from the urea charged.

Note that the total percent above slowly approaches 100. It is believed that when no heel is used, a fourth compound, possibly sodium cyanurate, is formed and this compound converts very slowly to sodium cyanate.

Example 3

A heel of 98.8% pure sodium cyanate weighing 14.0 parts is charged to a stainless steel, muller-type mixer ("Simpson Mix Muller") having a chamber beneath the bed plate through which hot oil is circulated. A charge of soda ash comprising 4.7 parts and a charge of shotted urea comprising 5.3 parts is dumped into the heel while the mixer is at room temperature. The muller wheels are engaged, and the oil heater and pump started. After 1.8 hours and oil is at 175° C. and the mixture is at 110° C. Samples are then taken at hourly intervals. The following results are obtained:

| Time, hours after mixture reached 110° C | 0 | 1 | 2 | 3 | 4 |
|---|---|---|---|---|---|
| Oil temperature, °C | 175 | 176 | 176 | 176 | 176 |
| Batch temperature, °C | 110 | 122 | 126 | 126 | 125 |
| Sodium cyanate, percent | 74.8 | 95.7 | 97.3 | 99.5 | 99.5 |
| Urea, percent | 13.4 | 1.8 | 0.94 | 0.58 | 0.58 |
| Sodium Carbonate, percent | 11.4 | 2.9 | 1.01 | 0.60 | 0.60 |
| Total, percent | 99.6 | 100.4 | 99.2 | 100.7 | 100.7 |

A total of 19.35 parts of a fine, white, free-flowing powder is discharged from the muller, giving a yield from urea of 94.5%. No evidence of corrosion is found in the muller.

If the weight of sodium cyanate formed in each hourly period is calculated, 45.8% of the total synthesized is found to have been formed before the reactor batch reaches 110° C. and 92.4% before it reaches 122° C., which occurred within the next hour.

Example 4

An impure heel comprising 14.0 parts, analyzing 72.9% sodium cyanate and 20.9% urea is charged to a stainless steel, muller-type mixer at room temperature. Next, 5.3 parts of shotted urea and 4.7 parts of soda ash are charged, the muller is started and heat is applied by circulating oil at 175° C.

The first sample is taken 1 hour and 40 minutes after startup, when the material has reached 110° C. Samples are then taken at hourly intervals. The following results are obtained:

| Time, hours after mixture reached 100° C | 0 | 1 | 2 | 3 | 4 | 5 | 6 |
|---|---|---|---|---|---|---|---|
| Oil temperature, °C | 175 | 175 | 175 | 175 | 175 | 175 | 175 |
| Batch temperature, °C | 110 | 115 | 114 | 122 | 122 | 125 | 129 |
| Sodium cyanate, percent | 57.0 | 76.8 | 81.3 | 84.8 | 90.0 | 95.4 | 98.3 |
| Urea, percent | 31.1 | 21.0 | 16.0 | 13.0 | 8.3 | 5.5 | 0.4 |
| Sodium carbonate, percent | 12.5 | 3.6 | 2.7 | 2.0 | 2.2 | 1.9 | 0.9 |
| Total, percent | 100.6 | 101.4 | 100.0 | 100.2 | 100.5 | 102.8 | 99.6 |

After cooling, the product is discharged and weighed. The total weight of 16.2 parts results in a yield of sodium cyanate of 65.1% from all of the urea present in the starting charge.

Again, in this example, when the amount of sodium cyanate formed is calculated, it is found that only 31.6% of the total cyanate formed is synthesized before the reactor contents reach 110° C. and that it takes three more hours to reach 122° C. where still only 80.4% of the total cyanate is formed. These results indicate that a high purity heel is needed to give the beneficial results.

Example 5

16.7 parts of 95% pure potassium cyanate is charged into the muller-type mixer described in Example 3. The muller wheels are engaged and the heel is heated to 97° C. 5.1 parts of 94.4% pure potassium carbonate is then charged and when the temperature reaches 105° C., 4.4 parts of shotted urea is charged. An analysis after five hours shows that the reaction mixture consists of 92.7% potassium cyanate.

Example 6

A "Thermascrew" (Rietz Manufacturing Co. of Santa Rosa, Calif.) hollow screw conveyer having an eight-inch diameter hollow screw four feet long situated in each arm of a jacketed, double U-trough is charged with a heel of 20 parts of 97% sodium cyanate. The thermascrew is operated at 29 r.p.m. and the heel is heated to 132° C. by hot oil passing through the hollow screws and the jacket. A mixture of 18.5 parts of soda ash and 22.6 parts of shotted urea is charged into the Thermascrew over a period of 55 minutes.

A muller mixer of the type described in Example 3 is also charged with 20 parts of the 97% sodium cyanate and this heel is heated to 90° C. Fifteen minutes after charging of the Thermoscrew is begun, ten parts of its contents is transferred to the muller mixer and a like amount of the contents of the muller mixer is transferred to the Thermascrew. Every 15 minutes thereafter for 5 hours, this transfer is repeated. The analyses of the contents of the muller mixer are:

| Time After First Transfer (hr.) | Sodium Cyanate, Percent | Sodium Carbonate, Percent | Urea, Percent |
|---|---|---|---|
| 1.00 | 83.2 | 9.48 | 8.59 |
| 2.00 | 95.3 | 3.77 | 3.02 |
| 2.75 | 96.4 | 2.85 | 1.90 |
| 3.75 | 96.4 | 2.54 | |
| 4.75 | 97.2 | 2.62 | |

Example 7

3.8 parts of 94.4% pure potassium carbonate is charged into the muller-type mixer described in Example 3 and is heated for 0.5 hour using oil at a temperature of 175° C. Then, 18.0 parts of 92.9% potassium cyanate is charged and the resulting mixture is heated to 104° C. 4.3 parts of shotted urea is then charged and the mixture is mulled and heated for 4.0 hours. At the end of the fourth hour the mixture analyzes 94.1% potassium cyanate.

I claim:

1. A process for preparing an alkali metal cyanate comprising reacting: (1) an alkali metal carbonate, and (2) urea in the presence of a heel of an alkali metal cyanate, which heel is at least 90% pure, while providing intensive rubbing, smearing, and mixing action at a temperature of from 80° C. to 225° C., said heel comprising at least 35% by weight of the reaction mixture, the alkali metal of said carbonate and the alkali metal of said heel being the same.

2. The process of claim 1 wherein said carbonate is sodium carbonate.

3. The process of claim 2 wherein said heel is sodium cyanate which is at least 95% pure.

4. The process of claim 2 wherein said sodium carbonate and urea are present in essentially equivalent amounts.

5. The process of claim 4 wherein said heel is sodium cyanate which is at least 98% pure.

6. The process of claim 4 wherein said heel comprises at least 45% by weight of the reaction mixture.

7. The process of claim 1 wherein said carbonate is potassium carbonate.

8. The process of claim 7 wherein said heel is potassium cyanate which is at least 95% pure.

9. The process of claim 7 wherein said potassium carbonate and urea are present in essentially equivalent amounts.

10. The process of claim 9 wherein said heel is potassium cyanate which is at least 98% pure.

11. The process of claim 9 wherein said heel comprises at least 55% by weight of the reaction mixture.

References Cited

UNITED STATES PATENTS

| | | | |
|---|---|---|---|
| 2,770,525 | 11/1956 | Houpt | 23—75 |
| 2,801,154 | 7/1957 | DePree et al. | 23—75 |
| 3,222,126 | 12/1965 | Baskin | 23—75 |
| 3,321,270 | 5/1967 | Davis et al. | 23—75 |

OSCAR R. VERTIZ, Primary Examiner

HOKE S. MILLER, Assistant Examiner

U.S. Cl. X.R.

23—1